(12) United States Patent
Friedberg

(10) Patent No.: US 11,041,977 B2
(45) Date of Patent: Jun. 22, 2021

(54) OPTICAL PRINTING POSITIONAL SYSTEM

(71) Applicant: Martin F. Friedberg, Chicago, IL (US)

(72) Inventor: Martin F. Friedberg, Chicago, IL (US)

( * ) Notice: Subject to any disclaimer, the term of this patent is extended or adjusted under 35 U.S.C. 154(b) by 173 days.

(21) Appl. No.: 15/361,480

(22) Filed: Nov. 27, 2016

(65) Prior Publication Data

US 2017/0322347 A1    Nov. 9, 2017

Related U.S. Application Data

(60) Provisional application No. 62/258,543, filed on Nov. 23, 2015.

(51) Int. Cl.
| | | |
|---|---|---|
| *G02B 3/00* | (2006.01) | |
| *B29D 11/00* | (2006.01) | |
| *B29C 31/08* | (2006.01) | |
| *B29C 59/02* | (2006.01) | |
| *B29K 96/04* | (2006.01) | |
| *B29L 11/00* | (2006.01) | |
| *B29C 35/08* | (2006.01) | |

(52) U.S. Cl.
CPC .......... *G02B 3/0012* (2013.01); *B29C 31/08* (2013.01); *B29C 59/02* (2013.01); *B29D 11/00298* (2013.01); *B29D 11/00855* (2013.01); *B29C 59/022* (2013.01); *B29C 2035/0827* (2013.01); *B29D 11/00442* (2013.01); *B29K 2096/04* (2013.01); *B29L 2011/0016* (2013.01)

(58) Field of Classification Search
CPC ........ G02C 7/04; G02C 7/049; G02B 3/0012; G02B 2003/0093; G02B 1/041; B29C 31/08; B29C 59/02; B29C 35/007; B29C 2033/0005; B29D 11/00298; B29D 11/00442; B29D 11/00855; B29D 11/00788; B29D 11/0038
USPC .......................................................... 269/287
See application file for complete search history.

(56) References Cited

U.S. PATENT DOCUMENTS

| | | | | |
|---|---|---|---|---|
| 4,121,885 A | * | 10/1978 | Erickson .......... | B29D 11/00048 264/1.7 |
| 6,071,440 A | * | 6/2000 | Wang ...................... | B29C 33/34 264/1.1 |
| 2004/0108607 A1 | * | 6/2004 | Winterton ........... | B29C 37/0032 264/1.32 |
| 2007/0132124 A1 | * | 6/2007 | Dubey ................ | B29C 33/0038 264/1.32 |
| 2008/0231801 A1 | * | 9/2008 | Iuliano ................... | G02C 7/041 351/159.73 |
| 2012/0126281 A1 | * | 5/2012 | Moshtagh et al. ........................... | B29D 11/00298 257/100 |

(Continued)

FOREIGN PATENT DOCUMENTS

WO    WO 02096629 A2 * 12/2002 ........... B29D 11/005

OTHER PUBLICATIONS

See attached Description (Year: 2012).*

*Primary Examiner* — Tyrone V Hall, Jr.
*Assistant Examiner* — Abbie E Quann
(74) *Attorney, Agent, or Firm* — Excellere IP International; Anne Burkhart

(57) ABSTRACT

An optical printing positioning system is set forth. The system includes a cavity for retaining an optical surface having an inner surface dimensioned and configured to maintain and to constrain an optical surface disposed therein when the optical surface undergoes a printing process.

4 Claims, 17 Drawing Sheets

(56) References Cited

U.S. PATENT DOCUMENTS

2012/0177819 A1\* 7/2012 Jin et al. .......... B29D 11/00298
427/164

\* cited by examiner

OPTICAL PRINTING POSITIONAL SYSTEM

RELATED APPLICATIONS

This application claims benefit of priority from U.S. provisional application No. 62/258,543 titled "Optical Printing Positional System filed 23 Nov. 2015, the entirety of which is incorporated herein by reference.

BACKGROUND

Current optical printing systems are not known for maintaining and constraining the relative position of optical surfaces within a cavity, wherein the cavity can be configured and used to facilitate both the formation of and subsequent printing upon the optical surface.

TECHNICAL FIELD

The present disclosure relates to a system and method constructed to facilitate improved printing of optical surfaces with an optical printing positioning system.

BRIEF DESCRIPTION OF THE DRAWINGS

FIG. 1A illustrates an exemplary lenticular surface formable according to the system and process set forth herein while

Throughout the various figures, like reference numbers refer to like elements.

DETAILED DESCRIPTION

Figure 1A:
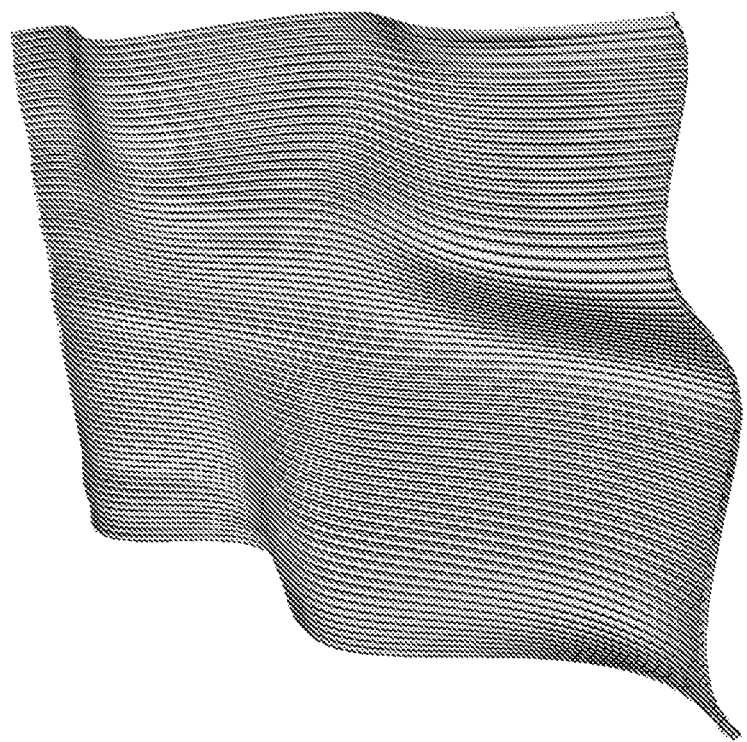

A need exists for printing optical surfaces, including plastic sheet or film and most particularly pliable or rubbery optical surfaces, that may or may not include one or more lenticular lenses, with precision. Conventional printing systems do not provide means for holding constituent optical features in a dimensionally reliable manner to provide precise registration during printing for certain optical surfaces. Certain applications could benefit from the precise printing of optical surfaces that may include, for example, one or more lenticular lens(es).

Printing of such optical surfaces requires a high degree of precision that is not readily obtainable with known printing systems. In such applications, printed information should precisely align with at least a portion of the optical surface, which may include one or more lenticular lenses, if desired, in order to achieve a desired optical effect with the printed optical surface. Such potential applications can include planar flexible and non-flexible optical surfaces, as well as compound curves, and optical surfaces capable of undergoing complex motion.

One such contemplated application, for example, includes manufacturing processes in the fashion industry involving the production of articles incorporating precisely printed optical elements, devices or surfaces that can satisfy consumer preferences. One preference many consumers have is to purchase products that feel good to the touch and provide impressive optical effects. Although some products have attempted to incorporate unique optical properties by encasing lenses, such as discussed in U.S. Pat. No. 7,364,314, the resulting products are not suitable to meet that consumer preference. In accordance with the principles herein, an optical surface, that can be formed of a pliable optical material, can be printed with an optical printing positioning system to achieve improved optical effects.

The optical printing positioning system constructed in accordance with principles herein can include a cavity for forming or constraining one or more refractive elements comprising optical array surfaces. The optical surfaces can include lenticular lenses or one or more lens array, if desired. The system further facilitates printing on rubbery optical surfaces and devices, which may or may not include one or more refractive elements, such as lenticular lens or other lens arrays, to produce desirable flexible optical effects while retaining flexibility of a printable device for a wide variety of applications.

In accordance with embodiments set forth herein, and encompassed within the scope of this disclosure, the optical printing positioning system of the present disclosure allows the constituent refractive elements, such as lenses, to remain positionally constrained relative to the overall optical surface, thereby held in a stable and reliable printing position, whether the optical surface is moving or stationary throughout the printing process.

Since constituent refractive elements of the optical surface are retained in a stable position, less variability is present in the media substrate and therefore useful results can be attained more consistently with an optical printing positioning system constructed in accordance with the principles herein. This will reduce the necessity for human intervention to make adjustments in order to compensate for such dimensional irregularities, as is frequently the case with convention printing systems, and therefore satisfactory throughput can be achieved while the skill level required of the operator can be reduced. As a result, simple printing systems including conventional ink jet and laser printing technology operated by comparatively unskilled persons can obtain the needed precision in printing optical surfaces with an optical printing positioning system constructed in accordance with the principles herein.

Figure 1B:
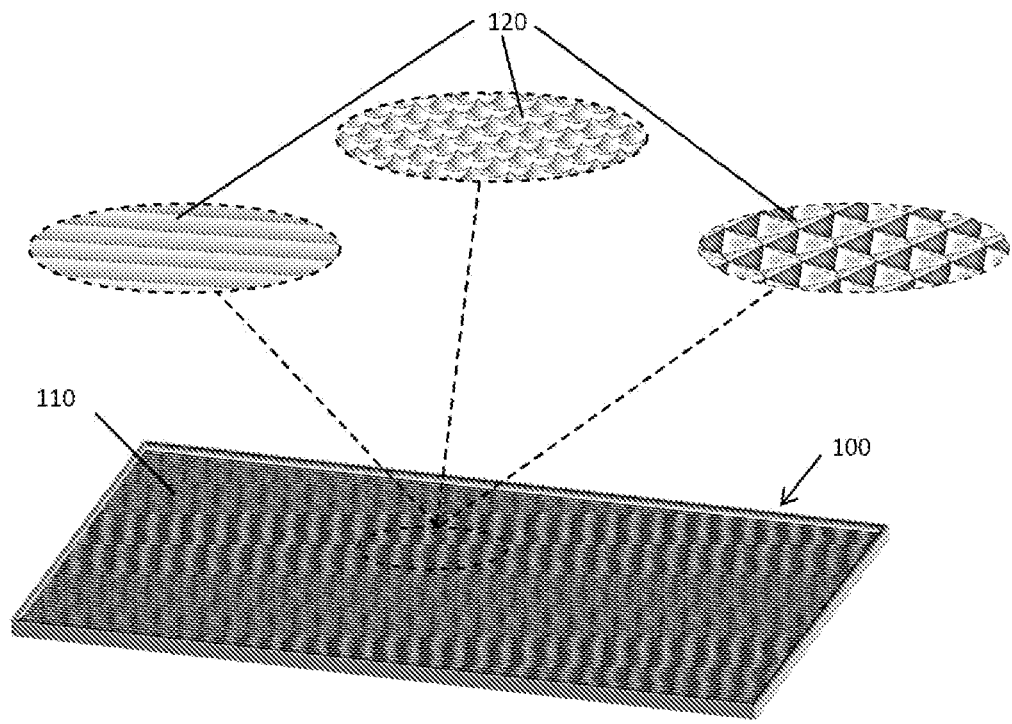
FIGS. 1B and 1C illustrate perspective views of exemplary embodiments of an optical printing positioning system constructed in accordance with the principles herein.
Figure 1C:
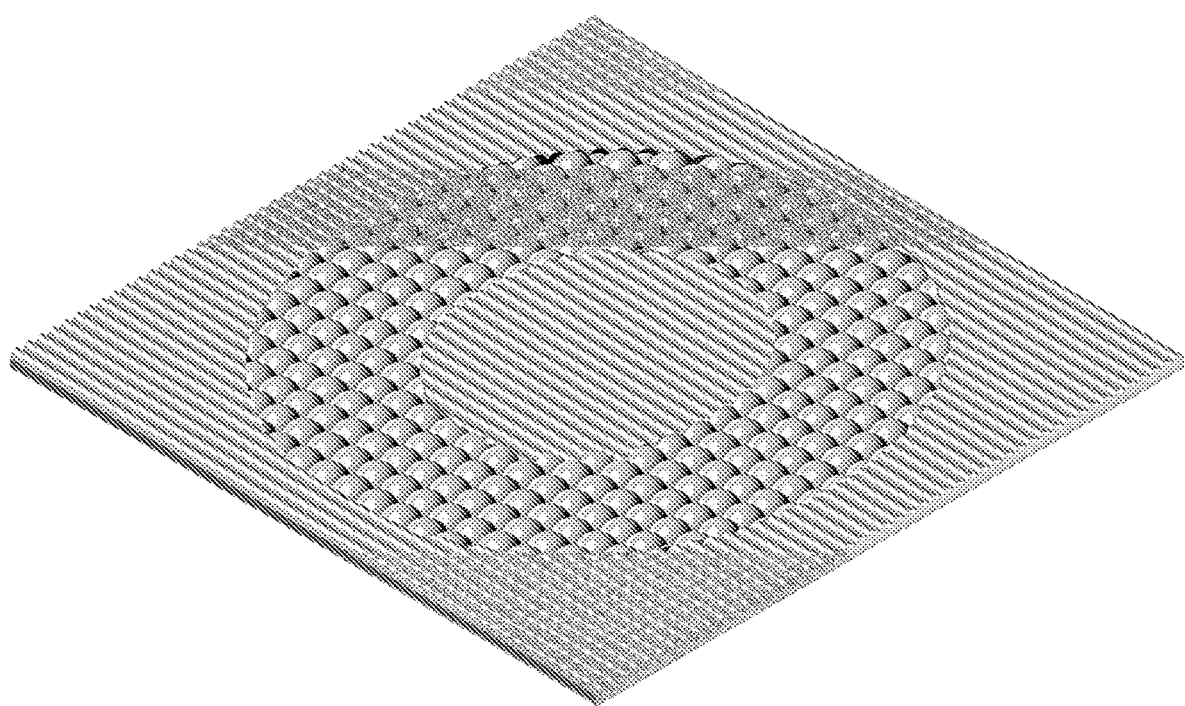
Figure 5A:
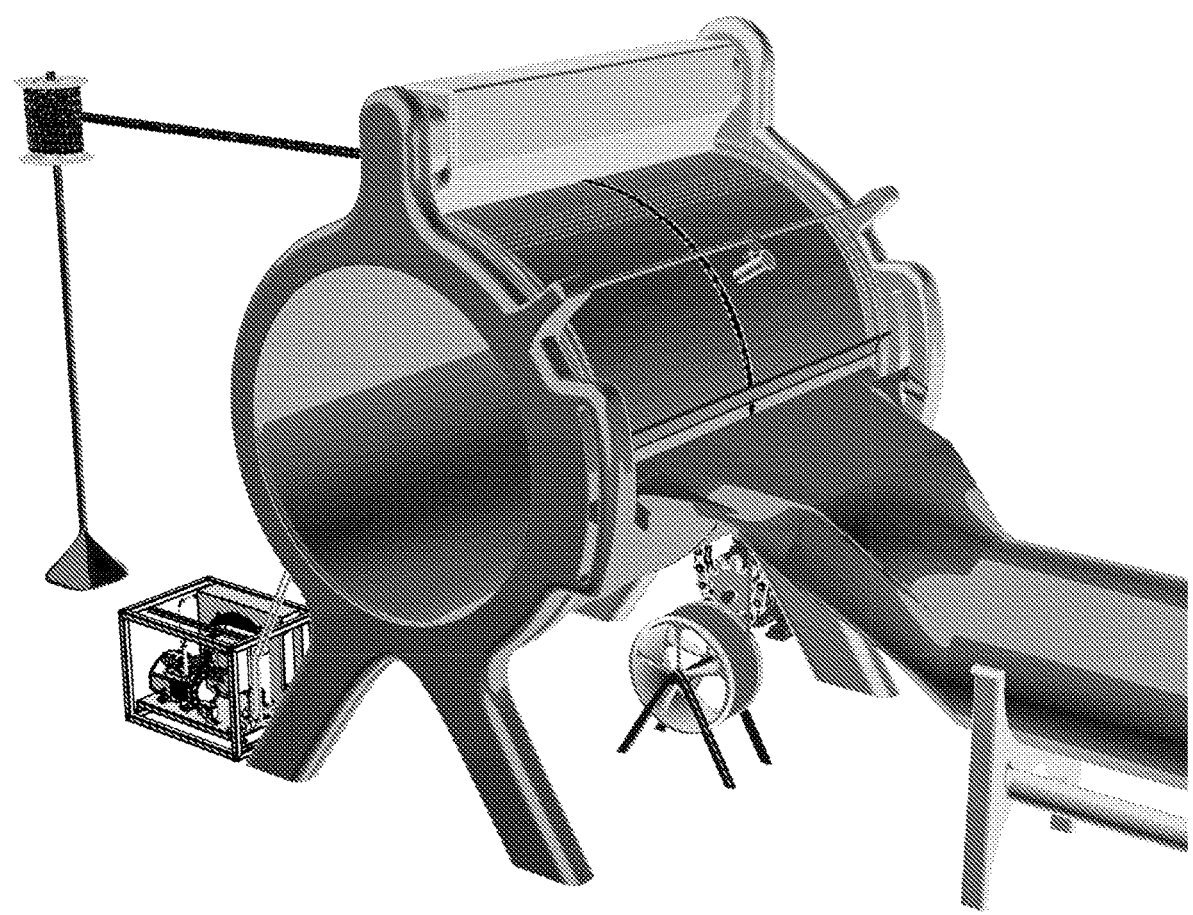
FIG. 5A-5D illustrate yet another exemplary embodiment of an optical printing positioning system constructed in accordance with the principles herein.

FIG. 1B illustrates an exemplary embodiment of an exemplary optical printing positioning system, wherein refractive elements comprising optical surfaces can be secured or formed within one or more cavities of the optical printing positioning system to form any desired optical surface. For example, the cavity or cavities can be internally configured to form or confirm a desired lens or prism array from a material inserted, formed, or dispensed therein, if desired. As illustrated in FIG. 1C, the present disclosure envisions optical surfaces containing multiple configurations of refractive elements, such as rectilinear and tetrahedron prisms or cylindrical and spherical lens, in various combinations comprising an optical surface. The cavities can be formed within a tray, if desired, or on a wheel as illustrated in FIG. 5A below. If desired, a cylindrical lenticular lens array can be constrained in a cavity 110 that can include a lens array forming cavity 120 of an optical printing positioning system 100 constructed in accordance with the principles herein.

In an embodiment, the cylindrical lenticular lens can be formed in the cavity for forming a lens array 120 using a suitable rubbery optical material, some examples of which are discussed in U.S. application No. 62/109,050 for "Pliable Optical Devices" filed 28 Jan. 2015 and incorporated herein in the entirety. The optical material can be formed into a desired shape while the material is setting in the cavity for forming a lens array 120, if desired. The cavity for forming a lens array 120 is constructed to facilitate printing of a lenticular lens array that is not only flexible, but can also move or conform to wavy contours in multiple directions as illustrated in FIG. 1A.

The shape forming cavity for forming a lens array 120 of FIG. 1B can be selectively and removably connected to the cavity 110 in the system 100 in order to shape the rubbery material in the cavity for forming a lens array 120, if desired. Any suitable configuration for the shape forming cavity for forming an optical array can be achieved in accordance with the principles herein. For example, the shape forming cavity for forming a lens array 120 can selectively connect with the cavity 110 having a series of cylindrical array elements, as illustrated in FIG. 1A.

Figure 2:
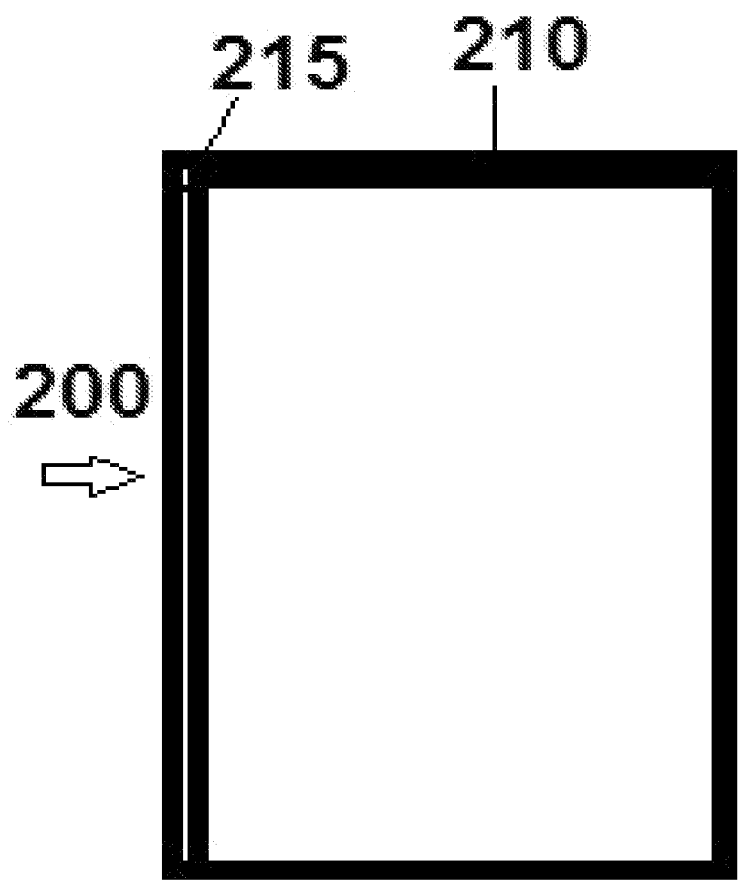
FIG. 2 is a top perspective view of yet another exemplary embodiment constructed in accordance with the principles herein wherein an optical surface can be constrained in a stretched configuration within the cavity via at least one securing point.

As illustrated in FIG. 2, an exemplary optical printing positioning system can include a cavity 210, the cavity including one or more securing elements 215 constructed to stretch a suitable optical surface secured therein prior to printing. The cavity 210 can be configured in any shape to produce a desired end piece of printed material, or to optimize cutting the material after printing with any suitable cutting method or device.

Figure 3:
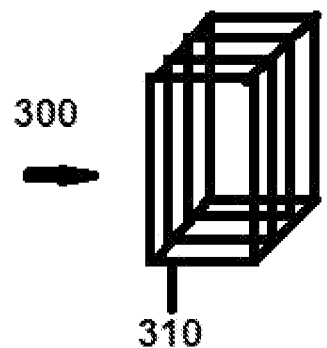
FIG. 3 is a front view of yet another exemplary embodiment constructed in accordance with the principles herein wherein printing cavities of the system for constraining an optical surface therein are partially transparent or translucent, and/or stackable and disposable, if desired.

As illustrated in FIG. 3, another exemplary optical printing positioning system can include a cavity 310 that can be configured using a stackable configuration. The cavity 310 can be formed of a material that partially or fully transparent or translucent, and can be disposable or suitable for reuse or recycling. When formed of partially transparent or translucent material, the tray can allow for the passage of light, such as UV light, through a wall of the cavity. If desired, the optical surface can be cured while in the tray using UV light, or any other suitable process.

An optical surface formed of a suitable material, such as a rubbery optical material, for example, can be formed in each cavity for forming an optical array of the tray stack prior to stacking and shipping. Alternatively, a blank stack of tray cavities for forming any desired number and configuration of optical surfaces with or without one or more lens arrays can form an optical printing positioning system configured to constrain the optical surface(s), and can be shipped, wherein an optical surface, such as a rubbery optical material, can be formed in a desired number of cavities from the blank stack prior to printing, and can be constrained in the desired number of cavities during printing.

Figure 4:
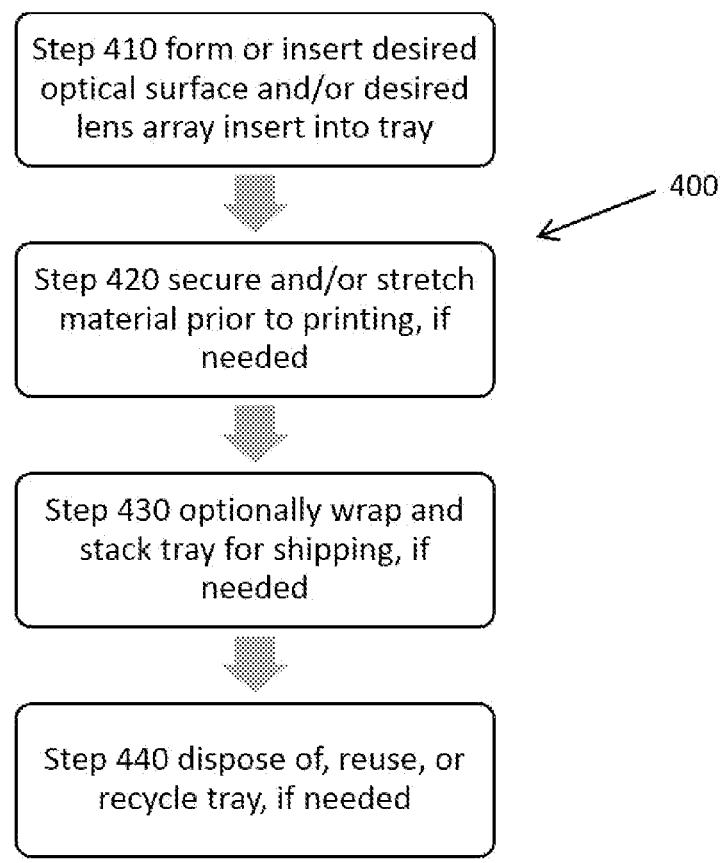
FIG. 4 illustrates an exemplary method constructed in accordance with the principles of the present disclosure of maintaining and constraining the relative position of optical surfaces within a cavity, wherein the cavity can be configured and used to facilitate both the formation of and subsequent printing upon the optical surface.

To this end, an exemplary method of forming an optical surface in an optical printing positioning system can include forming a rubbery lens array in a cavity, or printable media constraining cavity, of the optical printing positioning system as set forth in FIG. 4.

First, an exemplary optical surface or device is formed in a cavity for forming a lens array at step 410 while processing a suitable material, such as, for example, an acrylic block copolymer. One such suitable acrylic block copolymer is Kurarity™, or any other material that is a thermoplastic acrylic block copolymer based on poly methy methacrylate-polybutyl acrylate. For example, the material may be a AB diblock (poly methy methacrylate-polybutyl acrylate copolymer) or ABA tri-block (poly methy methacrylate-polybutyl acrylate-poly methy methacrylate copolymer).

In the acrylic block (A), the polymer block whose main component is a methacrylic ester unit is a polymer block mainly constituted of a methacrylic ester unit. Examples of the methacrylic ester for forming the polymer block include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, allyl methacrylate, phenyl methacrylate, benzyl methacrylate, phenoxyethyl methacrylate, 2-hydroxyethyl methacrylate, 2-methoxyethyl methacrylate, and glycidyl methacrylate, which can be used alone or as a mixture. In the acrylic block copolymer (B), the polymer block (B) whose main component is an acrylic ester unit is a polymer block mainly constituted of an acrylic ester unit. Examples of the acrylic ester for forming the polymer block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, allyl acrylate, phenyl acrylate, benzyl acrylate, phenoxyethyl acrylate, 2-hydroxyethyl acrylate, 2-methoxyethyl acrylate, and glycidyl acrylate, which can be used alone or as a mixture. These block copolymers can be considered: the thermoplastic acrylic block copolymer is chosen from the following triblock copolymers: polymethyl methacrylate/polybutyl acrylate/polymethyl methacrylate (pMMA-pBuA-pMMA), poly(methyl methacrylate-co-methacrylic acid)/polybutyl acrylate/poly(methy methacrylate-co-acrylic acid)/polybutyl acrylate/poly(methyl methacrylate-co-acrylic acid) (p(MMA-co-MAA)-p-BuA-p(MMAcoMAA)) and poly(methyl methacrylate-co-acrylic acid)/polybutyl acrylate/poly/methyl methacrylate-co-acrylic acid) (p(MMAcoAA)-pBuA-p(MMAcoAA)).

Once made, the rubbery optical devices can be constrained within the cavity of the optical printing positioning system prior to printing, if needed, at step 420.

If the cavity is formed in a stackable configuration, the cavity can then be stacked with one or more cavities for shipping at step 430. The cavity can further be formed of a disposable material or a material suitable for recycling as shown at step 440. Any combination of these steps 410 through 440 can result in an optical printing positioning system adapted to constrain a desired form and shape for a flexible material and to facilitate printing of an optical surface. The processing of the rubbery material can be achieved in a suitable manner, such as with heating, curing with UV light, or any other suitable method. Any suitable size, orientation, or lens configuration is contemplated to be formed with or without the removable cavity for forming a lens array discussed herein, including, for example, a lens array having non-linear complex curves. For example, the cavity can further include a lens shaping bottom that is integrally formed with the cavity.

FIG. 5A-5D illustrates another exemplary optical printing positioning system. The system can include a combination extrusion and printing process, wherein a spool of thread or cord can be incorporated, if desired. The spool can be located anywhere in the system, such as under the system, can be directed into a groove of the system that runs between two adjacent cavities configured to form optical surfaces therein.

Multiple spools and cavities can be provided, such that each spool can feed a particular groove. The thread can be directed onto the groove at a point in the extrusion process where the material to be extruded, or somewhat prior to extrusion, such as plastic or any other suitable material, can be extruded using an extruder onto an exterior face of a wheel. The thread can intersect the volume of the material and the groove. Next, excess material can be removed by scraping excess material that overflows beyond any of the one or more cavities of the exterior face of the wheel by a suitable method, such as by a scraping member. Excess material from the scraping step can be removed from the system in any suitable fashion, such as by using a chute connectable to the system. Once the material is cooled or otherwise substantially solidified, the thread is then contained within a volume of the material. The foregoing serves as an exemplary embodiment. Certainly quite similar results are achievable by introducing a series of removable positioning forming cavity structures and optionally the aforementioned cord which would subsequently be filled with material within an area capable of being closed, such as via in-situ injection molding.

A suitable temperature sensor, such as a thermistor, which can be a compact temperature sensor in some applications, can be included in the system, if desired, to ensure the material has reached a substantially solidified state when printed. The thermistor can further confirm optimal feed rates and other operational parameters. A suitable printing head can be provided. The printing head can be formed in any suitable shape, size and type, such as ink jet, flexography, offset printer, bi-sublimation, etc. or a standard printer adaptable to incorporate into the system can be provided.

Further, a take-off spool or other suitable device for removing and storing the resulting goods, such as by rolling onto a spool or fan folding into a stack, can be provided, if desired.

In addition, operational parameters can provide system feedback. For example, the number of drum rotations, ink usage or other parameters can be used to determine when a spool has been filled.

Moreover, a refrigeration unit can be provided, if desired. In addition, the drum can be preheated to facilitate filling of the cavities along with the optional grooves if desired. The refrigeration unit can be limited to cooling the cavities after scraping and before printing.

A motor can be provided for driving the wheel upon which the drum is disposed. A bin can be provided for feeding or providing material to the extruder.

Figure 5B:
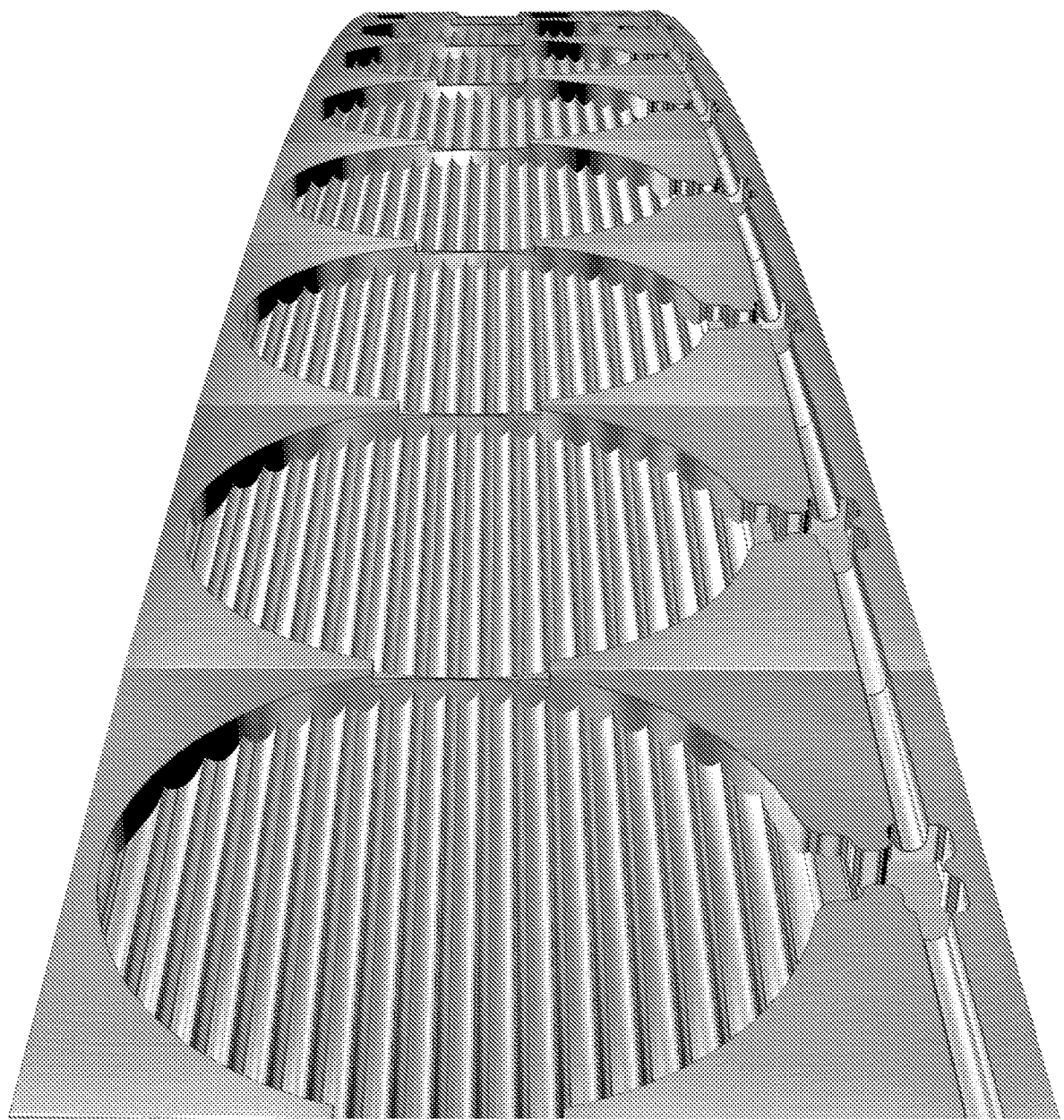

FIG. 5B is a close up view of the cavities and groove of FIG. 5A. Not only can there be a textile cord that can connect the cavities but the cavities can be connected to each other with or without the cord by spillover material. The cavities can be formed to assure the relative position of each optical surface, or lenticular lens, to the print head of the printer. In this manner, lens arrays of an optical array can be constrained relative to one another and to the printing head. As a result, no warpage, shrinkage, or stretching will occur when using the optical printing positioning system since the dimension and position of each refractive element, such as lenses, is known in the sequence.

By connecting the adjacent optical surfaces, the position of the optical surfaces is maintained, and the surfaces will not twist during processing. The outer surface of each cavity is flat, so each optical surface can be constructed to form individual sequins, if desired. The sequins can be substantially transparent and flat, with a smooth surface suitable for printing on one side, and with lenticular surfaces on the opposite side through which the printing may be viewed with the desired refractive effect.

Cavities can be planar, if desired, and each cavity segment can be formed as a modular unit so that if one becomes damaged, it can be replaced independently. All figures are of an exaggerated scale for purposes of illustration.

A knob can be provided adjacent to each cavity. The knob can form a T-shape, such that a stitch can be applied over and around the T-Shape knob in a triangular formation to attach the resulting optical surface to a fashion device or accessory, if desired. The knob or other suitable attaching device avoids a disruption in the optical effect of the optical surface that could be caused by thread going over an optical surface to secure the optical surface to a targeted device.

Figure 5C:
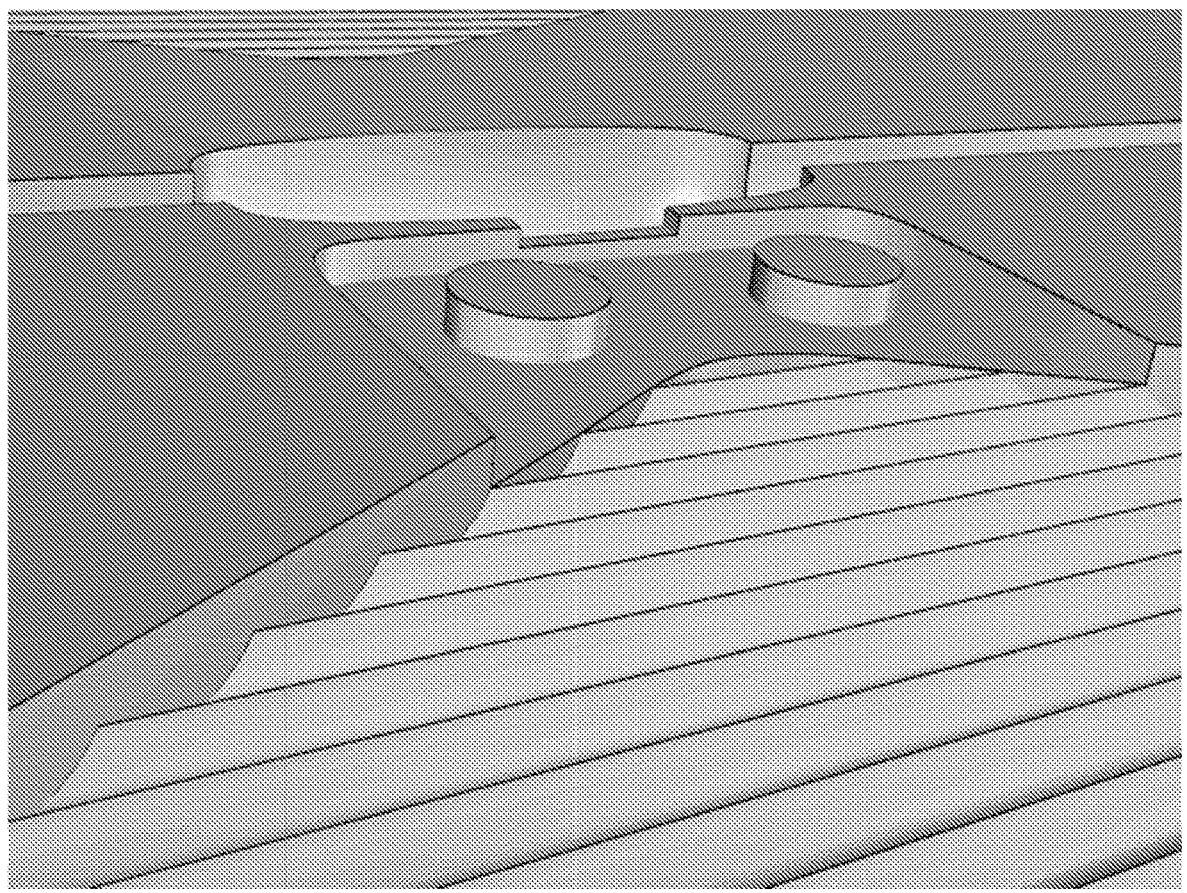

As illustrated in FIG. 5C, for certain optical surfaces, such as sequins, the system can advantageously create frangible or severable connections between optical surfaces. For applications where it is desirable to connect optical surfaces, the optical surfaces can be extracted from the cavities by any suitable means, such as by injector pins or suction, for example.

Figure 5D:
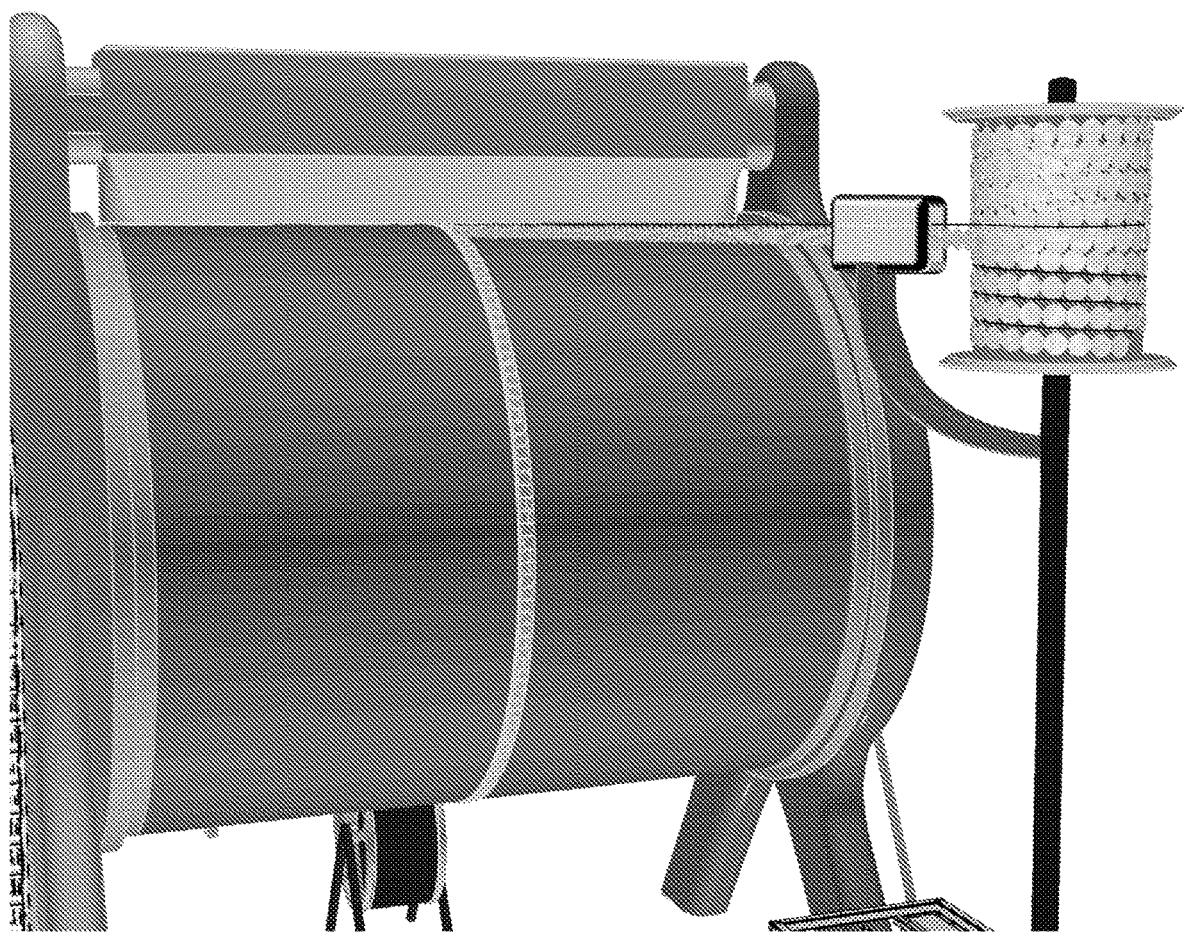

FIG. 5D illustrates how each of the optical surfaces can be constrained in position. The optical surfaces can be left in the mold or cavity while moved through a printing station of the system. Multiple wheels of cavities and thread sources can be provided across the cylinder, if desired.

Figure 6A:
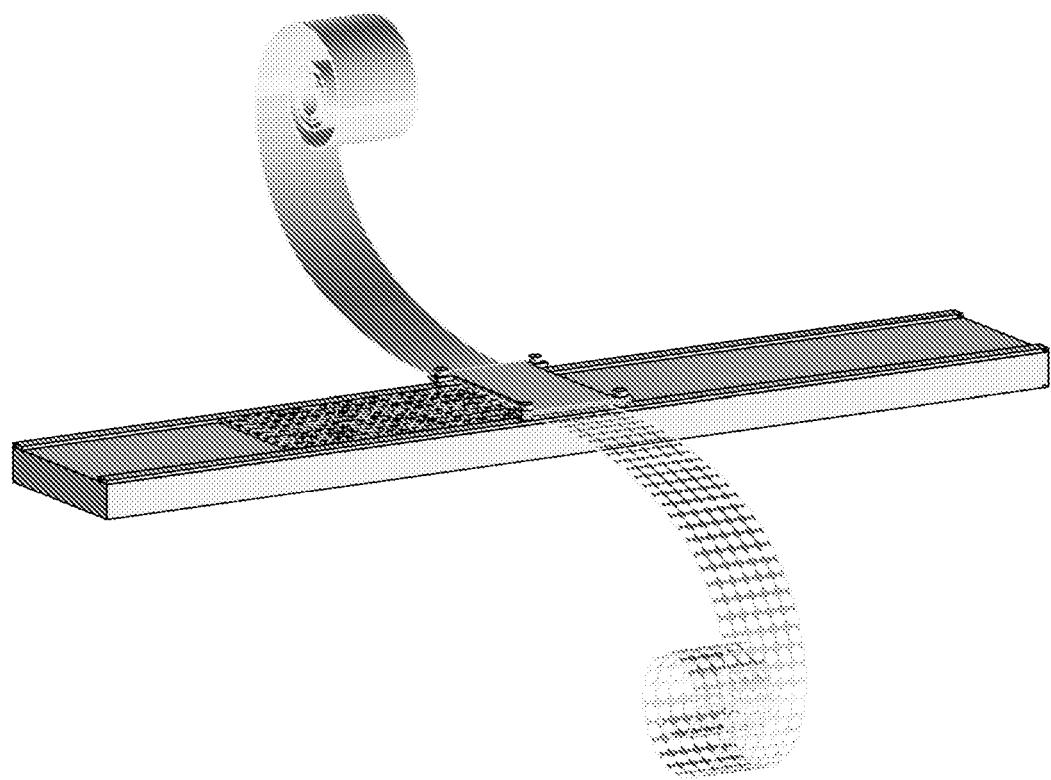
FIG. 6A-6I illustrates yet another exemplary embodiment of an optical printing positioning system constructed in accordance with the principles herein.

As illustrated in FIG. 6A, yet another optical printing positioning system can be configured to process pre-extruded material for use as optical surfaces.

As seen from the right side of the figure, plates with suitable forming cavities are transversely slidable within a guiding fixture. The plates are pushed from left to right by mechanical means (not shown) in spacial increments of one plate width at a time. Each plate is positioned precisely for processing, as they are locked down after every movement. Locking mechanisms (not shown) are utilized to assure absolute proper positioning.

A pre-extruded thickness of material (or liquid acrylic or other material cured with uv light) being stretched over the plate, and solid pressure unit which features a cutting die, descends from above to cut the pre-extruded material into shape and force the material down into shape forming cavity(ies). A portion of a die that forces material into the cavity can be thicker than a part not forcing material into cavity so as to press the material therein. As the cavity is warmed material within it fuses to the cord and conforms to the shape of the cavity to form optical surfaces, or arrays.

Once the arrays are formed in the cavities, the pressure unit can lift or be lifted up, and can plate be advanced so that a fresh span of material can come over the next plate. The material that forms the optical surface becomes stabilized by whatever is required in the process, ie cooling or other steps to stabilize the material within the cavity.

Figure 6B:
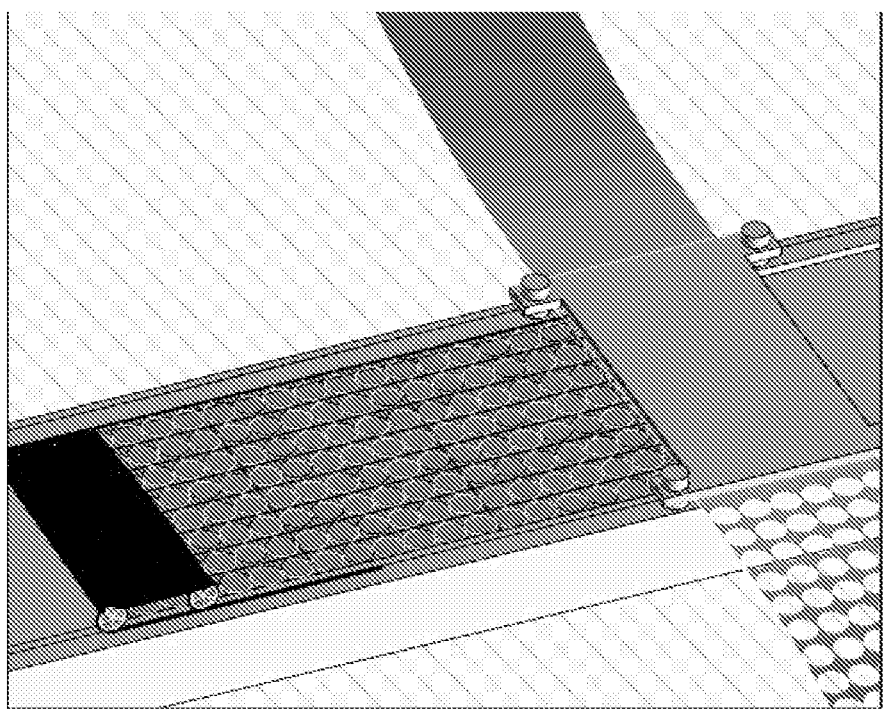

As illustrated in FIG. 6B, material can be conveyed into one or more cavities across a work space, where the material is formed in the cavity and then constrained therein while being printed. A printer can be provided that moves while the plates are held stationary, if desired. The cord shown in FIG. 6B can be optional, but it can be useful to incorporate a suitable device that removes the optical surface from the optical printing positioning system, such as the cord shown, to help remove processed optical surfaces from the cavities. Any device that stores the material in one or more cavities across a printing work space, where the cavity holds each constituent of an optical array in relative position to one another so the overall optical array is in a precise position and then constrained therein while being printed is within the scope of the present disclosure. In the embodiment of FIG. 6B, plates of cavities can be circulated for reuse in a suitable manner.

In an embodiment, thread can be introduced from one side of the device while sequins are taken off on other side. A straight span or conveyor can be used to process the optical surfaces or sequins. Ink can be printed on the flat side of the optical surfaces while the material is in the cavity, or for example, plates can be shipped ready to print. Pre-printed sequins, that can include a white backing applied, can be rolled into a spool easily directly from the system. At any point in time, lenticular printing can occur once the optical surfaces stabilize in the cavities, and the printing process can facilitate an output of a substantially continuous lenticular design, if desired.

In other embodiments, fewer or only one optical array can be formed in a plate. In this case, the cord may not be necessary to connect the optical surfaces.

The optical surfaces can be assembled closer to one another when installed for use, on a garment for example, than is the distance between them while they are formed. During the formation process, the distance between each optical surface is likely to be no less than the width of each optical surface. However, they can be attached in closer proximity on a device or garment once the cord is removed from the optical surfaces, such as sequins. The finished product can be imbricated by the manufacturer of the end product when applied.

There is no particular way required to line up and present plates. The plates can be processed using a typical conveyor process, or circulated in any suitable manner.

For example, in FIG. 6B a printer head can be movably mounted on the system, where the printer is configurable to print each optical surface with different optical information from one optical surface to the next one adjacent to it. In this manner an image can be progressed across a range of optical surfaces so that a printer(s) can proceed across a plate while the plate is maintained in position. Alternatively, the plates can move relative to the printer during printing. Printing can be accomplished in a variety of ways to achieve the overall design. Embodiments herein can facilitate the use of ink jet printers, though ink jet printers are not typically used in the production of lenticular designs due to lack of precision of known systems, though they are sometimes used to produce samples or proofs in small quantities.

As shown in FIG. 6B, an area between the two printer wheels can be printed while constrained in a cavity of a tray, plate, or workpiece full of one or more optical surfaces. A thin film of white opaque cold laminate can be applied in suitable manner, such as via adhesion, upon the top of the ink once applied by the printer, since the process can print on the back of the lens.

To separate optical surfaces, connectors can be formed in a cutting or punching step or integrally formed in cavities of the system.

UV light can be applied to the optical surfaces in any of the embodiments contemplated herein to stabilize the optical surfaces. UV or any other needed stabilizing devices can be integrated into the system, or otherwise provided to the system.

Structure can be integrated into the optical surfaces and formed to facilitate attachment, such as holes that can be used to attach, such as by sewing, the optical surfaces to an end-piece, such as a garment. Any cavity can be formed of any of various kinds of lens array, spherical, aspherical, cylindrical, or otherwise optical array, or combination within any one or more cavities. Alternatively, structure can be removable inserted into a cavity to form a desired array pattern.

Figure 6C:
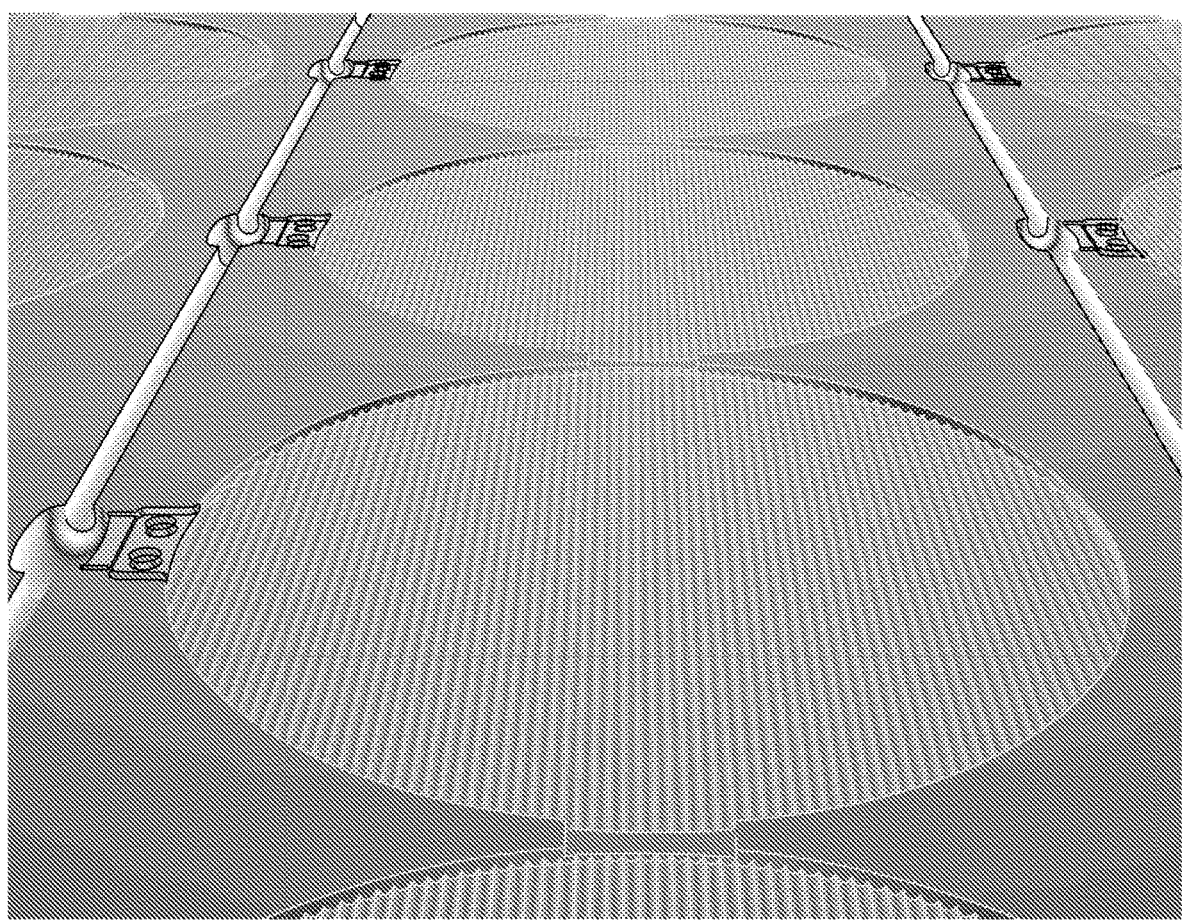
Figure 6D:
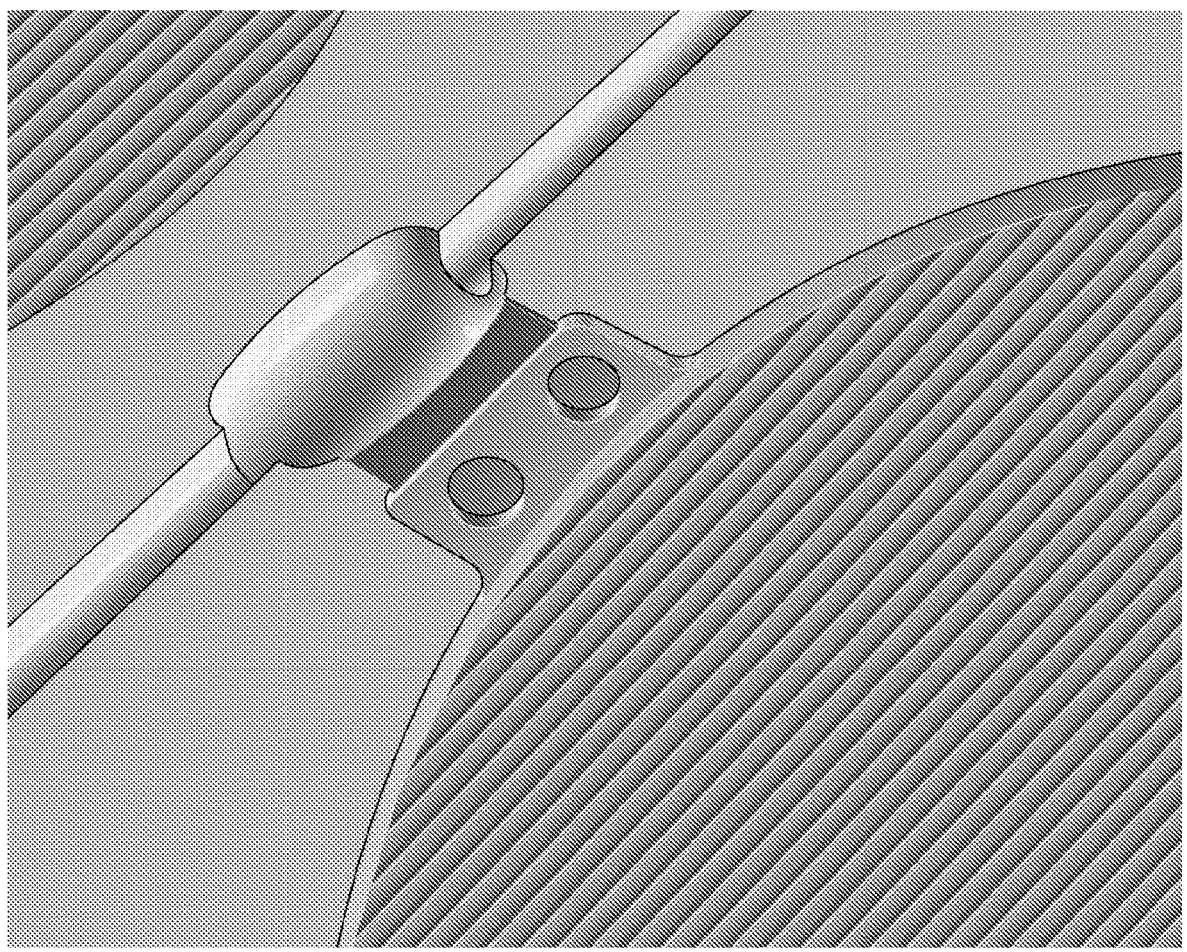
Figure 6E:
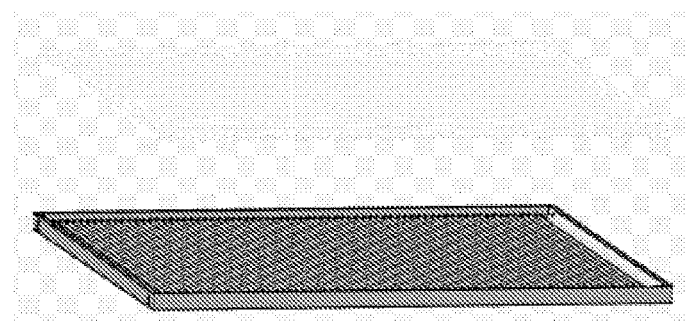
Figure 6F:
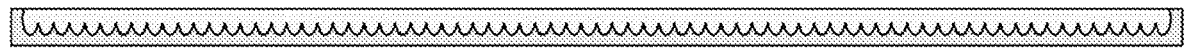
Figure 6G:
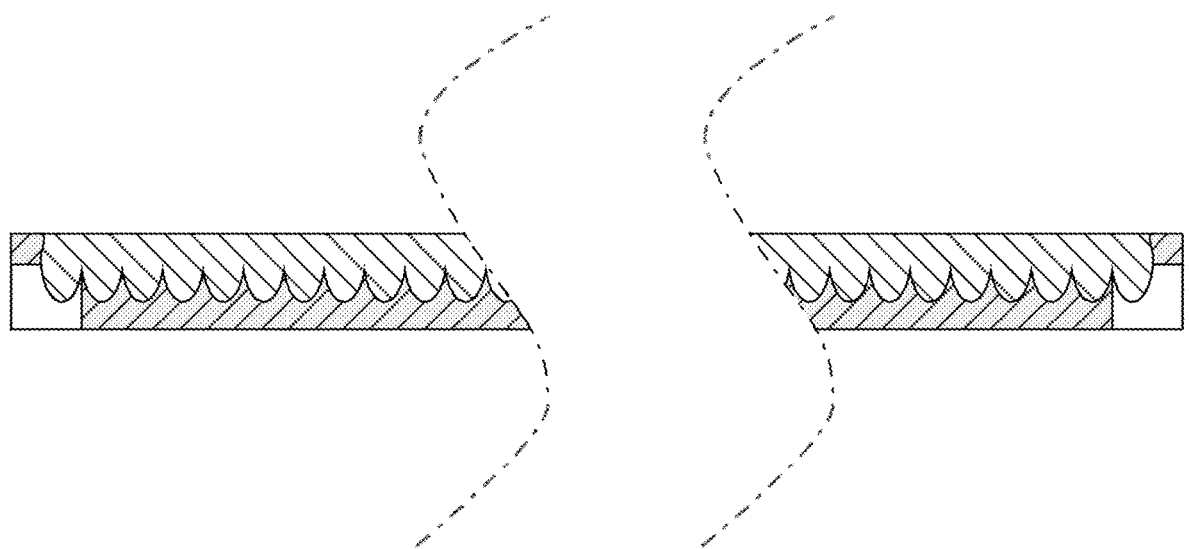
Figure 6H:
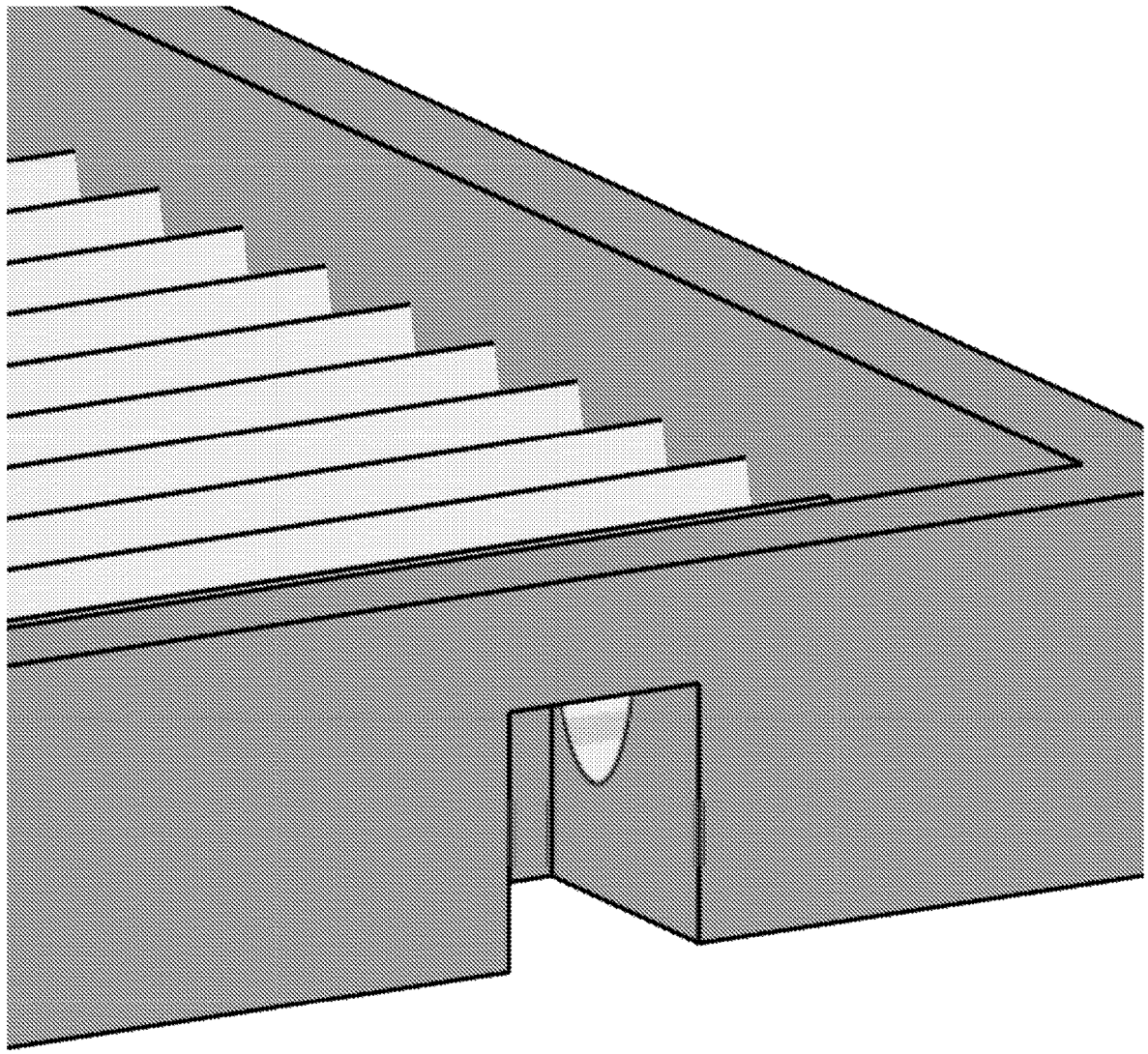
Figure 6I:
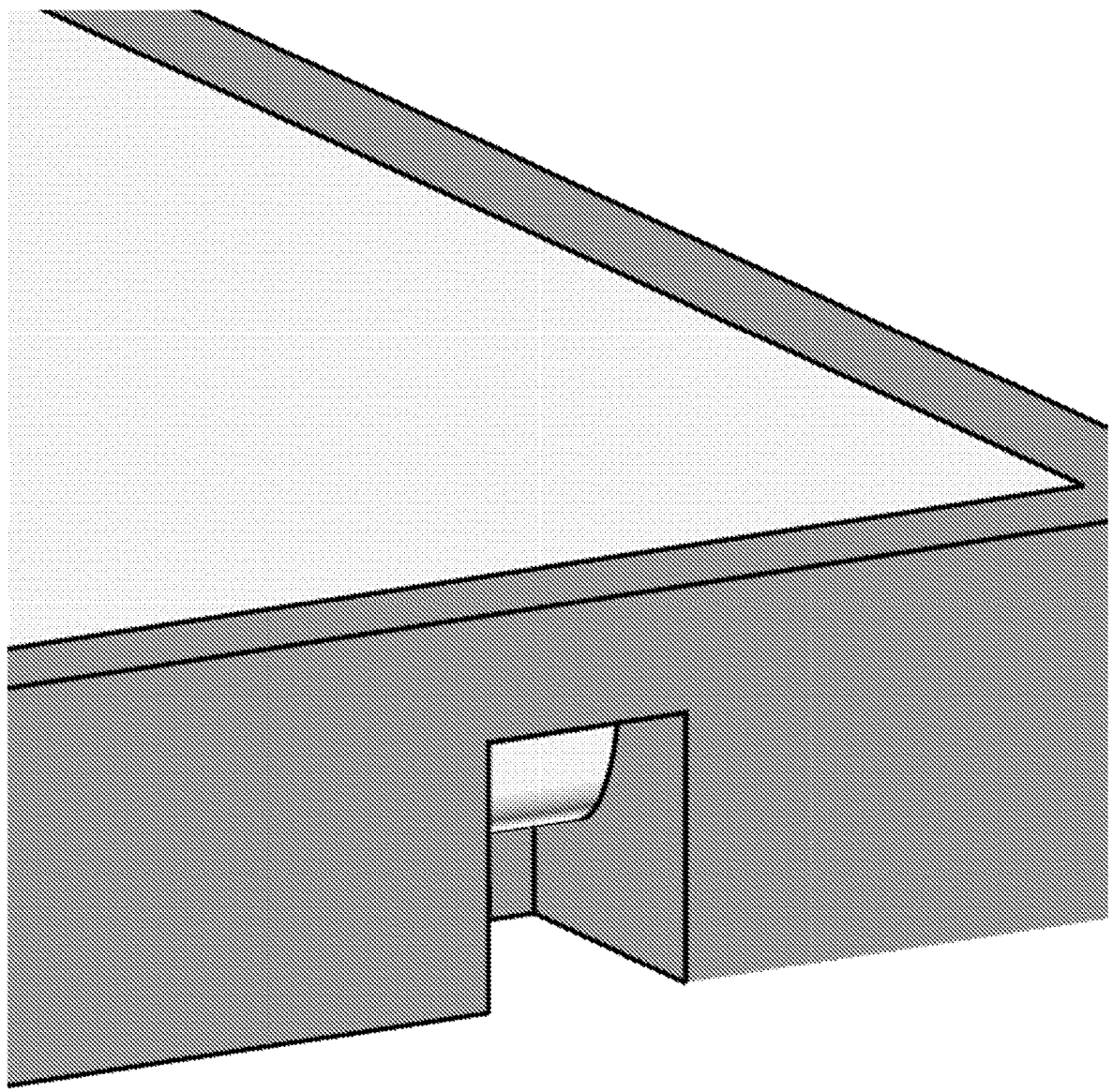

FIG. 6C is a close up view of cavities including grooves for positioning a cord or thread therein. FIG. 6D is a close up view of severable connections between, the optical surfaces and the thread. FIG. 6E is an exploded view of an optical surface shown above a cavity of an optical printing positioning system. FIG. 6F shows a cross sectional view of an optical surface shown within a cavity of an optical printing positioning system. FIG. 6G is a close up of FIG. 6F and includes hash marks to distinguish between an optical surface and a cavity of an optical printing positioning system. FIG. 6H illustrates an optical printing positioning system including another exemplary embodiment of a removing device that includes an access point to the cavity that facilitates the application of pressure to an optical surface when positioned therein. FIG. 6I shows an optical surface positioned within the cavity of FIG. 6H.

Figure 7A:
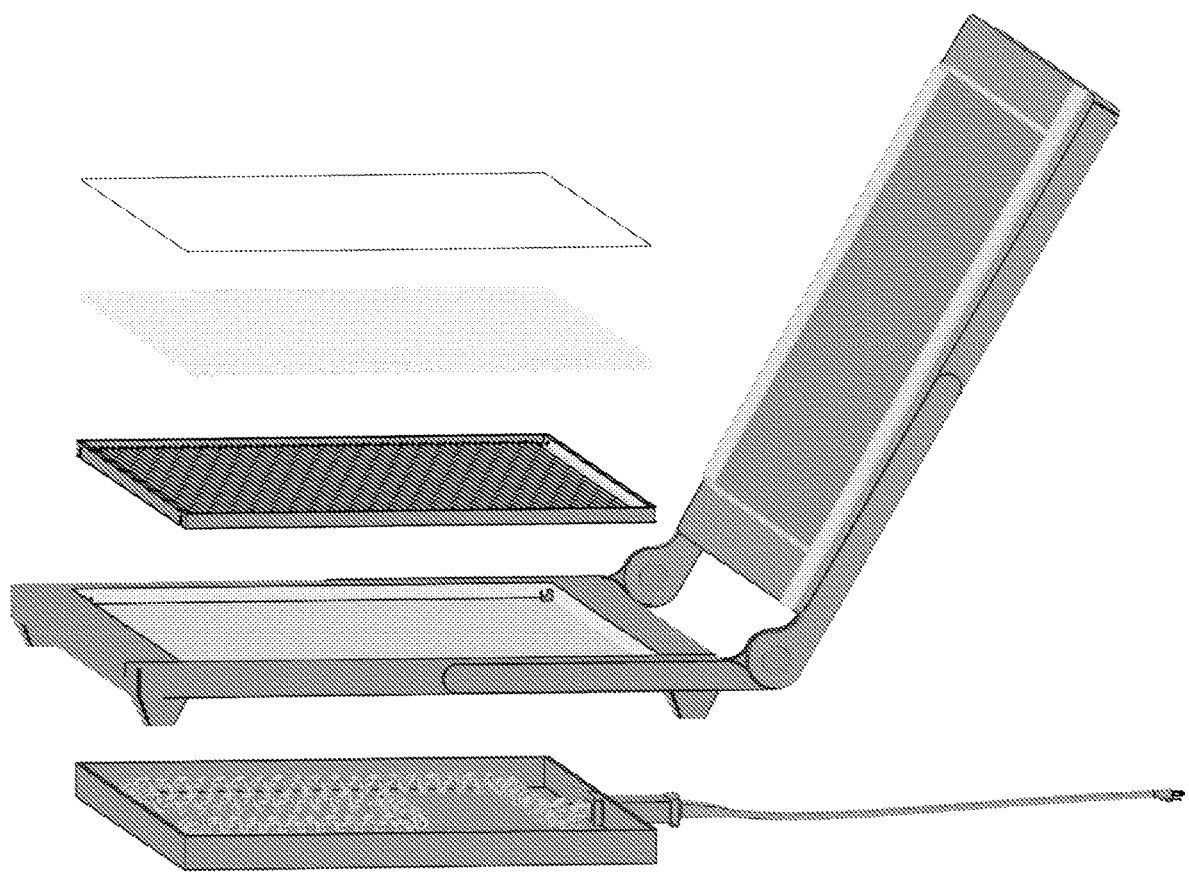
FIG. 7A-7C illustrates still another exemplary embodiment of an optical printing positioning system constructed in accordance with the principles herein.
Figure 7B:
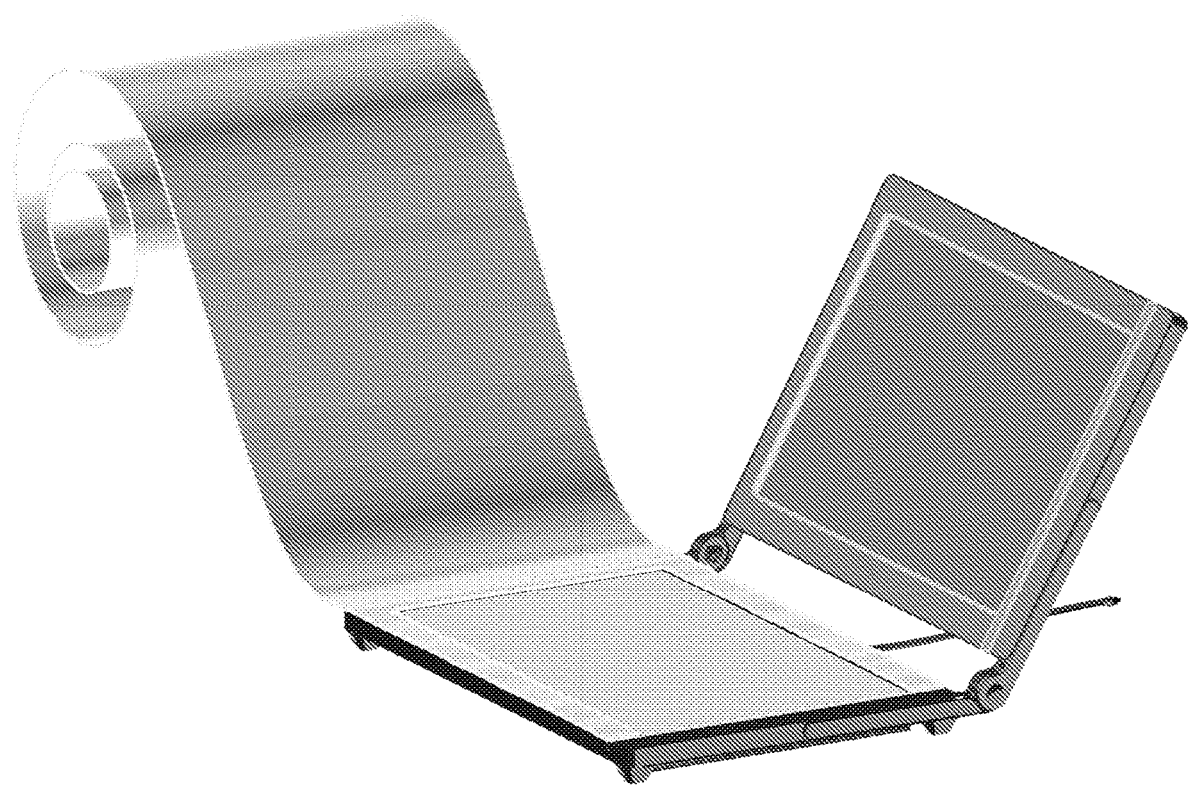
Figure 7C:
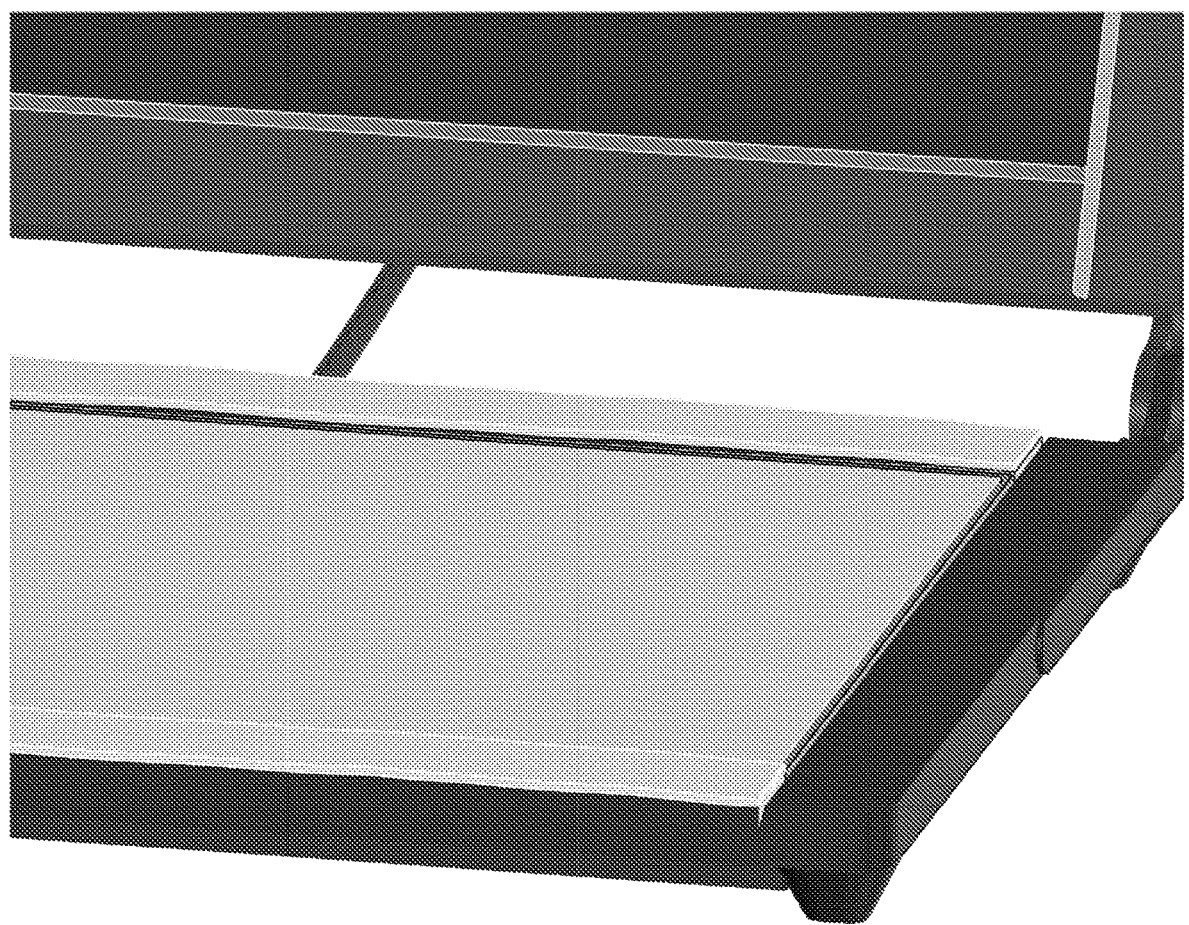

FIGS. 7A to 7C illustrates an embodiment of a system wherein various processing steps can occur by the use of a selectively closeable top provided over a tray. The top can be selectively connected to the tray, such as via a hinge or other mechanism, if desired. The top can be used to help shape material in the tray, if desired. The top can also be used to stabilize material in the tray by passing UV light or providing other processing energy needed to form the material. A printer can also be fixedly or removably connected to the top, if desired. Alternately, a printer can be formed integrally to the tray or other part of the system, where an overall combined system is desired.

Heat can be provided in connection with the system if heating is desired or can be configured to provide UV light, for forming the optical surfaces from a pre-sized piece of material (or liquid acrylic or other material cured with UV light) as illustrated by the optional heating element shown in a forming tray of FIG. 7A. The system can be configured to provide heat to process the material within the forming cavity. Alternatively, the forming cavity may be removable, as depicted, so as to allow the system to process material in another separate forming cavity while the material cools or otherwise solidifies. The ability to provide removable forming cavities also ensures the option of printing the optical surface elsewhere is available, while still maintaining the dimensionally constraining advantages of the system.

It is a general practice in lenticular printing to affix a white opaque backing layer, for example film or paper, over the printed surface against which the ink is applied during printing. Such ink is typically substantially translucent, and the presence of a white opaque layer can greatly improve visibility of the ink. It is not uncommon for the ink to be applied to the backing layer which is affixed to and displayed through the optical surface, rather than being applied directly upon the optical surface. Such a backing layer is shown above an optical surface in an exploded view, FIG. 7A. In accordance with the principles of the present disclosure, a backing can be affixed to a constrained surface to ensure precise registration of the image with the surface. Thus, the system herein allows the precise printing of materials that could not successfully achieve precise registration in known systems by constraining the material within the optical printing positioning system. The system disclosed herein offers the same dimensional stability advantages in either case, whether the ink is applied to the optical surface or to the affixed backing.

FIG. 7B illustrates an exemplary embodiment of FIG. 7A adapted to process substantially continuous rolls of base material to form optical surfaces in a constraining forming cavity. A cutting implement may be included to sever the material to a desired size. FIG. 7C shows a detail close-up of the embodiment of FIG. 7B, illustrating clearance space for the aforementioned cutting implement to pass through the base material during operation.

While exemplary embodiments of the present disclosure are provided herein, various changes and modifications can be made without departing from the spirit and scope of the disclosure. The scope of the disclosure is indicated in the appended claims, and all changes that come within the meaning and range of equivalents are intended to be embraced therein. For example, variations in the forming and/or any other features described in the present disclosure are within the spirit and meaning of the appended claims.

I claim:

1. An apparatus comprising: a plate including a bottom, sides, and an inner area being a cavity, wherein the cavity having an array of arcuate curved walls which do not extend beyond a top surface of the sides, the sides further comprise an inner wall surface being arcuate with a portion of an inner wall surface extending inwardly and configured to selectively receive more than one optical workpieces with the inner wall surface having an inner top surface curve to maintain and to constrain the optical workpieces selectively disposed therein when undergoing a printing process over at least a portion of the optical workpieces; and an aperture in the side forming an opening through the bottom of at least one of the array of arcuate walls to facilitate removal therefrom of the optical workpieces.

2. The system apparatus of claim 1, wherein the plate is configured to stackably ship with a plurality of other said plates.

3. An apparatus comprising: a plate including a bottom, sides, and an inner area being a cavity, wherein the cavity having an array of rectilinear walls that conform to a desired lens or prism array which do not extend beyond a top surface of the sides, the sides further comprise an inner wall being arcuate with the top surface extending inward configured to selectively receive one or more optical workpieces, the top of the sides formed and shaped to maintain and constrain the optical workpieces selectively disposed therein when undergoing a printing process over at least a portion of the optical workpieces; and an aperture in the side forming an opening through the bottom of at least one array of rectilinear walls to facilitate removal therefrom of the optical workpiece.

4. An apparatus comprising: a plate including a bottom, sides, and an inner area being a cavity, wherein the cavity having an array of tetrahedron-prism walls which do not extend beyond a top surface of the sides, the sides further comprise an inner wall being arcuate with the top surface curving inward configured to selectively receive one or more optical workpieces with the inner wall having the inner top surface maintain and constrain the optical workpieces selectively disposed therein when undergoing a printing process over at least a portion of the optical workpieces; and an aperture in the side forming an opening through the bottom of at least one array of tetrahedron-prism walls to facilitate removal therefrom of the optical workpiece.

* * * * *